April 13, 1926.
H. E. VAN DERHOEF
LUBRICATED FILM
Filed Nov. 6, 1924
1,580,180
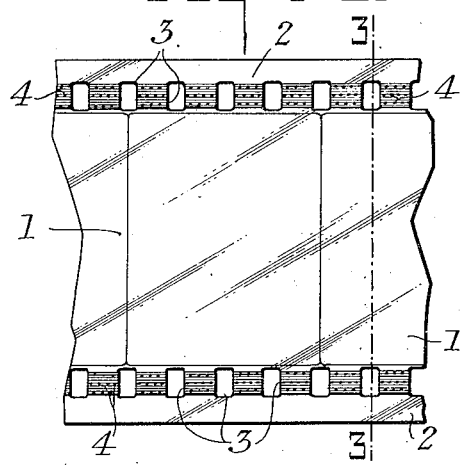
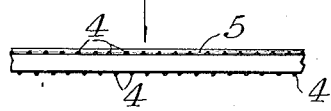 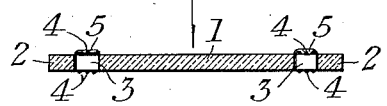
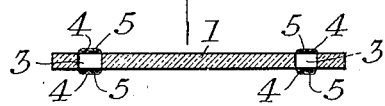 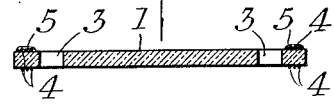
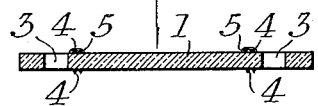 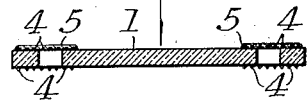
INVENTOR.
Henry E. Van Derhoef,
BY
R. L. Stinchfield
ATTORNEY Patented Apr. 13, 1926.

1,580,180

UNITED STATES PATENT OFFICE.

HENRY E. VAN DERHOEF, OF ROCHESTER, NEW YORK, ASSIGNOR TO EASTMAN KODAK COMPANY, OF ROCHESTER, NEW YORK, A CORPORATION OF NEW YORK.

LUBRICATED FILM.

Application filed November 6, 1924. Serial No. 748,289.

*To all whom it may concern:*

Be it known that I, HENRY E. VAN DERHOEF, a citizen of the United States of America, residing at Rochester, in the county of Monroe and State of New York, have invented certain new and useful Improvements in Lubricated Film, of which the following is a full, clear, and exact specification.

This invention relates to motion picture film. One object of the invention is to provide such a film, the durability of which is very greatly increased. Another object of the invention is to lessen abrasion marks in the film during use. Still another object is to obtain said durability and lessened liability to abrasion without substantially interfering with the normal motion of the film on the customary sprockets and other film-advancing devices. Still another object is to facilitate the passage of the film through the gates and similar parts of motion picture apparatus. Further objects will hereinafter appear.

In the drawing,—

Fig. 1 is a fragmentary diagrammatic plan view, upon an enlarged scale, of a motion picture film embodying my invention;

Fig. 2 is a fragmentary diagrammatic side view of the same;

Fig. 3 is a diagrammatic sectional view taken on the line 3—3 of Fig. 1;

Fig. 4 is a diagrammatic transverse sectional view showing a slightly different embodiment of my invention;

Figs. 5, 6, 7 and 8 are diagrammatic transverse sectional views of film embodying still different modifications of my invention.

When motion picture films are repeatedly projected, they eventually become worn or torn so that they can not be further used. During use they also become abraded, the effects of this action showing in the projected pictures. It is highly desirable to increase the durability of the film both against wear and tear from repeated projections and against abrasion.

I have found that unexpected and very large durability or prolonged life of the film may be obtained by providing it outside the picture with parts at relatively higher and lower levels, there being a lubricant on the film outside the picture areas with at least part of it between said levels. I have found that the desired effect is obtained especially well when the portions of the film which move over elements of the motion picture apparatus are provided with spaced bearing parts or projections above the level of the picture areas of the film, a lubricant, especially a soft solid one, being located on such portions and between the projections. This result is readily accomplished, for example, by knurling the film adjacent each row of perforations to raise a multitude of minute, closely spaced, projections, and then applying a lubricant, like paraffin wax, over the knurled portions.

My invention has a wide applicability throughout the motion picture art. While I shall describe illustrative embodiments of it, as applied to standard forms of motion picture film, it will be understood that the invention is not limited to use in such films, except as indicated in the appended claims.

Referring to Fig. 1, the picture areas are indicated at 1 and the marginal portions are shown at 2 carrying the usual perforations 3. Along the lines of the perforations are arranged a multitude of minute closely adjacent, but spaced, projections 4. Along the margins 2 and especially over the multitude of projections 4 there is located a line of lubricant, such as paraffin wax, 5, the dimensions, especially thickness, being exaggerated in the drawing for the sake of clearness.

The projections 4 may be produced in many different ways. At the present time a convenient method is to knurl the film and thereby force out the projections from one or more of the surfaces of the marginal portions of the film. For instance in the case of standard motion picture film of 1⅜" width I have successfully carried out the invention by passing such film between knurlers each $\frac{3}{16}$" wide with the perforations of the film coming centrally under the knurlers, thus bringing the knurled strip, or lines of projections 4, from $\frac{1}{32}$" to $\frac{1}{16}$" inside the extreme edges of the film. This is, of course, merely given by way of example, and other widths and other locations can be usefully employed. When working with films of different width than that mentioned above, narrower knurled bands may be usefully placed along the perforations.

The height and spacing of the projections are open to considerable variation. The co-operation of the lubricant with them takes place even when the bearing level defined by the upper parts of the projections is separated from the lower level, such as the unaltered surface of the film, by a distance varying through a considerable range. In practice I prefer to keep the height of the projections above the face of the picture areas of the film less than one-fourth the height of the film, the projections in the present case being of a similar character to those defined in my co-pending application of even date herewith, Serial No. 748,290, filed Nov. 6, 1924, for motion picture film. But in the present invention I am not limited to the range defined in said co-pending application, because the unexpected cooperation between the lubricant and the projections takes place even when the latter fall outside the sizes indicated therein.

When the projections are formed by knurling, their height can be conveniently regulated by using the proper depth and shape of cuts in the knurlers and by adjusting the pressure with which the knurlers bear against the film. The knurlers may bear against the gelatinous photographic layer of the film, or against the uncoated cellulosic face of the film, so as to produce projections on one face only of the film, or they may bear against both faces to produce projections thereon. Where, as is customary, the film is provided with two sets of perforations, the knurling can be readily done along both lines of perforations simultaneously. It is useful, although not indispensable, to adjust the knurling so that the projections rise above the adjacent picture areas of the film by a distance of the order of magnitude of one two-thousandth of an inch. Consequently if there are projections on both faces of the film, the thickness of the latter, including the projections, will run approximately one-thousandth of an inch greater than the untreated portions of the film, say at the picture areas. These dimensions are, however, merely illustrative.

In the preferred form of my invention the projections with which the lubricant, such as paraffin, is associated are of a smaller order of magnitude than the perforations 3 in the film, so that several of the projections can be located in each of the spaces between successive perforations. I have found it convenient, for instance, to have the projections spaced roughly about 1/30 of an inch apart, and to locate them in parallel rows with the projections of one row staggered with respect to the adjacent rows. But, of course, any other convenient spacing may be adopted within the terms of the appended claims.

In Figs. 1, 2 and 3 the lubricant 5 has been applied to the film along the projections 4 only on one face of the film. It may, of course, be applied along both faces, as indicated in Fig. 4. The projections 4 may be wholly outside the perforations 3 and then have the lubricant 5 applied to them, as indicated in Fig. 5, or they may be located wholly inside the perforations 3 and have lubricant 5 applied to them, as indicated in Fig. 6. Moreover, these locations of the projections may be in a sense combined by having the projections extend not only between the successive perforations but both inside and outside the line thereof. This is illustrated in Figs. 7 and 8, lubricant 5 being applied to one face of the film only in Fig. 7 and to both sides in Fig. 8. While the projections 4 are preferably integral with the film, they may, of course, be attached to the film so as to, in effect, become part thereof, instead of being struck up or forced out of the material of the film.

My invention is applicable to positive or negative motion picture film which is to pass over part of the motion picture apparatus. Moreover, my invention may be applied to the film either before or after exposure, development, etc. When applied to sensitized motion picture film before exposure, the effect of abrasion is lessened, because of the spacing function of my lubricated projections. But the most important and surprising effect is produced when they are present in the finished motion picture positive film bearing the completed pictures. When such film is passed through the projecting apparatus, the unexpected durability becomes apparent. For example, it has been repeatedly found that the number of times which film bearing my combined projections and lubricant will pass through a projector before breaking down is from 6 to 7 times greater than the number of times which the same kind of film without my invention will pass through the same projector before breaking down under exactly parallel conditions. The effect is, therefore, much greater than the extra durability imparted by the use of special size projections alone, as set forth in my hereinabove cited co-pending application. The locating of a lubricant along the line of projections and in the spaces between them produces an effect far greater than either the use of projections alone or lubricants alone. In other words, by combining them an unexpected result is accomplished greater than the sum of their normal independent effects.

In the drawing, for the sake of clearness, the principal projections produced by knurling, for example, are indicated; but any connecting or intersecting lines made incidentally by knurling are omitted. Of course, the shapes of the projections can vary, the showing of them as circular being merely diagrammatic for convenience.

Having thus described my invention what I claim as new and desire to secure by Letters Patent is:

1. A film strip comprising picture areas and portions outside said areas which move over elements of the apparatus in which the film is used, one face at least of said portions having bearing parts at one level for contacting said elements and other parts at a relatively lower level, and lubricant, softer than said bearing parts, located on said face at least a fraction of it between said levels.

2. A film strip comprising picture areas and portions outside said areas which move over elements of the apparatus in which the film is used, one face at least of said portions having spaced bearing parts with relatively lower parts between them and lubricant on said face, with at least a fraction of it on said lower parts between said bearing parts.

3. A film strip comprising picture areas and portions outside said areas which move over elements of the apparatus in which the film is used, one face at least of said portions having spaced bearing parts raised above the rest of said portions and above the level of said picture areas, and lubricant between said bearing parts in cooperative relation therewith.

4. A motion picture film strip comprising picture areas, and a marginal bearing section for sliding over parts of motion picture apparatus, said bearing section including spaced projections, and lubricant at least part of which is in the spaces between the projections.

5. A motion picture film strip comprising central picture areas and marginal tractive strips for sliding over parts of motion picture apparatus, said marginal strips having longitudinally spaced projections made out of the body thereof and above the level of said picture areas, and lubricant on said marginal strips among said projections.

6. A motion picture film having its edges knurled and having relatively soft lubricant stored in the hollows of the knurling below the tops of the knurling.

7. A motion picture film having longitudinal series of perforations and being intermittently thickened along said perforations, and having relatively soft lubricant stored on the unthickened portions between and below the tops of said thickened portions.

8. A motion picture film having its margins thickened by spaced projections, the thickness of said margins including the projections being less than one and one-half times their thickness excluding the projections, a lubricant being located on said margin among the projections.

9. A motion picture film having perforated margins knurled to be less than one and one-half times the thickness of the rest of the film and a waxy lubricant applied over the knurled portions.

10. A motion picture film strip comprising picture areas, and a bearing section for sliding over parts of motion picture apparatus, said bearing section including spaced projections having a height of the order of magnitude of one two-thousandth of an inch and lubricant at least part of which is in the spaces between said projections.

11. A motion picture film comprising perforated margins having lines of spaced projections forced out of the body thereof above the levels of the front and rear faces, and a soft solid lubricant applied to said margins along said lines of projections, part at least of said lubricant being between the level of said faces and the level of the tops of said projections.

Signed at Rochester, New York, this 31st day of October, 1924.

HENRY E. VAN DERHOEF.